United States Patent [19]
Jysky et al.

[11] 3,945,613
[45] Mar. 23, 1976

[54] VIBRATING DEVICE

[75] Inventors: Göran Jysky; Ilmar Mardla; Björn Ericsson, all of Nykoping, Sweden

[73] Assignee: Ilmeg AB, Nykoping, Sweden

[22] Filed: Feb. 1, 1974

[21] Appl. No.: 438,934

[30] Foreign Application Priority Data
Feb. 1, 1973 Sweden.............................. 7301393

[52] U.S. Cl.............. 259/1 R; 55/112; 259/DIG. 43
[51] Int. Cl.² ........................ B06B 1/18; B08B 7/02
[58] Field of Search......... 259/1 R, DIG. 43; 55/112; 173/127, 134; 198/220 D; 425/432, 456

[56] References Cited
UNITED STATES PATENTS

| | | | |
|---|---|---|---|
| 711,859 | 10/1902 | Holden ........................ | 259/DIG. 43 |
| 2,472,568 | 6/1949 | Burt ............................... | 198/220 D |

FOREIGN PATENTS OR APPLICATIONS

| | | | |
|---|---|---|---|
| 1,107,001 | 5/1961 | Germany .................... | 259/DIG. 43 |
| 64,610 | 4/1914 | Austria .......................... | 198/220 D |

*Primary Examiner*—Robert L. Bleutge
*Assistant Examiner*—Alan Cantor
*Attorney, Agent, or Firm*—Fred Philpitt

[57] ABSTRACT

A vibrating device comprising a cylinder with at least one inlet opening for a pressure fluid and at least one outlet opening and a piston moveable in the cylinder. The cylinder is arranged to serve as a vibration generator and to be mechanically connected to the object which is to be subjected to vibrations. The piston moveable in the cylinder is made with a relatively great weight and is arranged to be moved from an inner end position to an outer end position by the pressure fluid admitted via the said inlet opening and to return to the said inner position under the influence of its own weight and escape of the said pressure fluid through the outlet opening.

4 Claims, 3 Drawing Figures

U.S. Patent    March 23, 1976    3,945,613
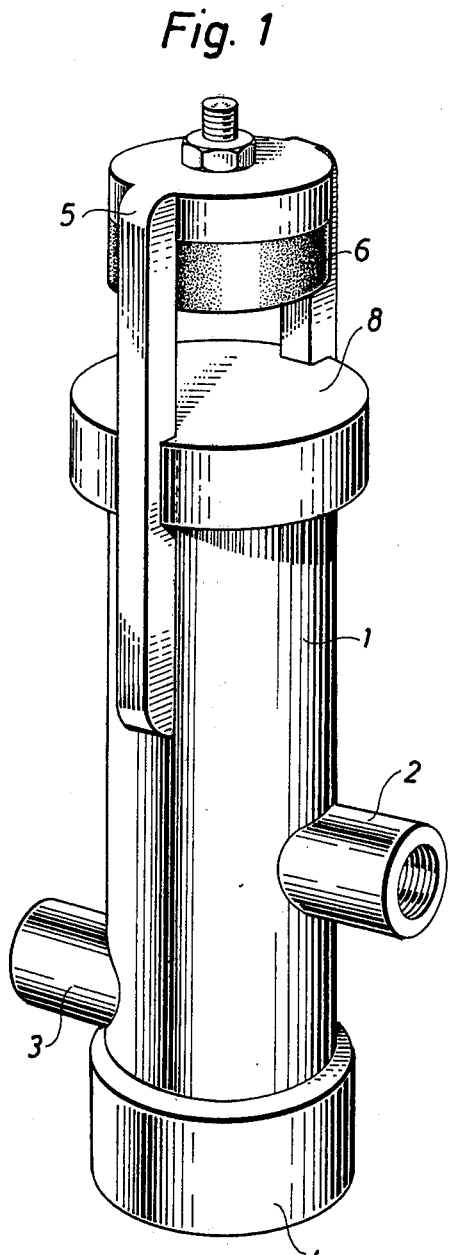
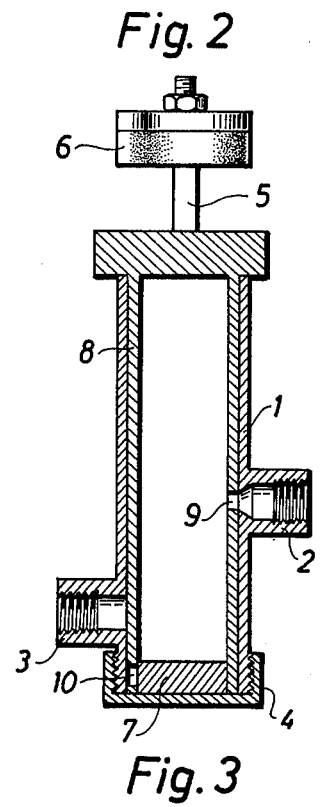
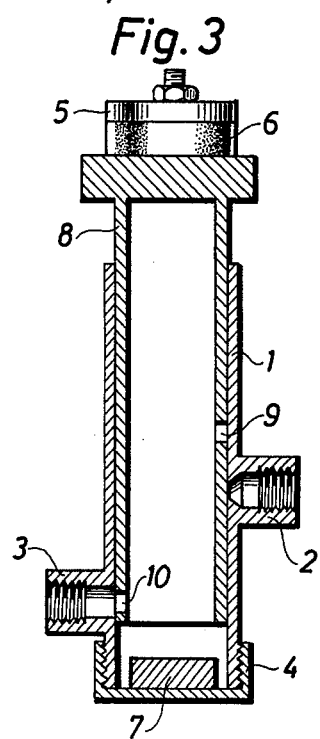

VIBRATING DEVICE

This invention relates to a vibrating device of the kind which comprises a cylinder and a reciprocatingly moveable piston which is driven by a pressure fluid fed to the cylinder.

Devices for collection of the stone dust formed in rock drilling usually include a cyclone with thereto connected filters. A current of air which carries the dust formed in the course of drilling is supplied to the cyclone, in which the coarser particles are separated, whereafter the air current, before being released to the atmosphere, is made to pass through one or a plurality of filters. In these the finer dust which is injurious to the health is separated from the air current. Since very large quantities of dust are formed in rock drilling the permeability of these filters very quickly becomes impaired. In order to prevent clogging of the filters, the filtering device is usually provided with an air-powered ball vibrator, which comprises a ball freely rotatable in a housing. When the ball rotates in the housing the latter is made to oscillate and these oscillations can be transmitted to the filters which will thus vibrate. The ball vibrators are highly reliable and rugged, but it has been found that they are not sufficiently effective, i.e. the vibrations achieved are not capable of keeping the filters clean. Thus the need of shaking the filters manually is not eliminated.

In other fields, use has been made in order to achieve more powerful vibrations of devices comprising a piston reciprocatingly moveable in a cylinder, the movement of which is controlled by compressed air supplied to the cylinder. In the utilization of such devices the cylinder is attached firmly in relation to the object which is to be vibrated and the movement of the piston is transmitted to the said object via a rod or the like. The requirement that the cylinder must be firmly attached in relation to the object which is to be vibrated makes it difficult for these devices to be utilized for certain applications. Moreover, they normally have a plurality of narrow air passages with valves for control of the piston, which greatly reduces the functional reliability of the device, particularly when this is used in dusty and moist environments and at low temperature.

The object of the present invention is to provide a vibrating device driven by a pressure fluid of cylinder-piston type, which achieves powerful vibrations, is simple to assemble and highly functionally reliable and rugged. It must also be able to be manufactured at low cost.

This is achieved according to the invention in that the device is so constructed that the cylinder serves as a vibration generator and is arranged to be connected directly to the object which is to be vibrated. The device is then made with a piston with relatively great weight which when accelerated or retarded gives rise to reaction forces on the cylinder, which forces are transmitted to the object to which the cylinder is attached. The device is also so designed that it does not require any further moving part apart from the said piston.

The invention will now be described in greater detail and in the description reference will be made to the embodiment thereof shown in the accompanying drawing, wherein FIG. 1 is a perspective view of a vibrating device according to the invention with the piston in its lower end position.

FIG. 2 is a sectional view through the vibrating device according to FIG. 1.

FIG. 3 is a sectional view through the device according to FIG. 1 but with the piston in an outer position.

The vibrating device shown in FIG. 1 comprises a cylindrical casing 1 with an inlet connection 2 which is intended to be connected to a compressed air line. Reference numeral 3 designates an outlet connection via which the consumed compressed air can be collected and removed through a line in order to be released at some suitable place. The cylinder 1 is at its lower end closed by means of a tubular sleeve 4, on the bottom face of which a homogeneous cylindrical body 7 is fitted (see FIGS. 2 and 3). A yoke 5 attached to the cylinder 1 extends above the upper end of the cylinder. Fitted to the yoke is an appropriately elastic damping body 6.

As seen best in FIG. 2 and FIG. 3, a piston 8 is moveably mounted in the cylinder 1. The piston has the form of a sleeve closed at its upper end with an outside diameter only negligibly smaller than the inside diameter of the cylinder 1. The closed end surface of the sleeve 8 is made with a slightly bigger diameter than the sleeve and has a relatively large wall thickness, which gives the sleeve a relatively great weight. The said enlarged section is provided with recesses corresponding to the shanks of the yoke 5, whereby very good guidance of the piston is obtained. Two openings 9 and 10 are made in the side walls of the sleeve which forms the piston. The opening 9 is located opposite the opening of the inlet connection 2 when the piston 8 is in an inner end position as shown in FIG. 2 whereas the opening 10 is located opposite the opening of the outlet connection 3 when the piston is in the outer position shown in FIG. 3.

The above described vibrating device functions in the following manner. When at rest the device is in the position shown in FIG. 1 and FIG. 2. When a compressed air line coupled to the inlet connection 2 is opened the piston 8 will be moved upwards at a speed proportionate to the pressure of the air supply. After only a short distance the opening 9 will have passed the opening of the inlet connection 2 so that further air cannot be admitted into the cylinder. The piston 8 will then, on account of its relatively large weight, be rapidly retarded, which occurs at approximately the same time as the opening 10 becomes aligned with the opening of the outlet connection 3. On account of the positive pressure in the cylinder, air will then flow out through the outlet connection 3 and the piston 8 will again be lowered by its own weight and, when the opening 9 again comes opposite the opening of the inlet connection 2, will receive a new compressed-air impulse, whereupon the cycle is repeated.

Although the device according to the drawing is so constructed that the piston 8 in its inner position bumps against both the bottom sleeve 4 and the upper edge surface of the cylinder 1 the device is appropriately made so that the opening 9 will co-act with the opening of the inlet connection 2 in a position in which the piston 8 has not yet reached the said surfaces. Similarly, the opening 10 is appropriately located so that the device can be driven without the piston in its outer position against the damping body 6. A device modified in this manner will work very gently without jolts and blows and will cause gentle vibrations of the object appropriately connected to the sleeve 4. By means of the circular body 7 mounted in the sleeve an annular slot is formed around the bottom surface of the sleeve 4 in which the sleeve-shaped piston 8 will slide down during its return movement. The air cushion thus contained in the annular clearance will contribute further to achieving gentle retardation of the piston 8.

Since the desired vibrations are transmitted via the cylinder, which is made possible on account of the fact that the relatively heavy piston 8 brings about large reaction forces on the cylinder upon acceleration and retardation respectively of the piston, the device can be mounted directly on the object which is to be subjected to the vibrations. The device is appropriately mounted vertically with the sleeve 4 connected to the said object. For shaking of filter hoses the device can for example be hung up in the stand supporting the hoses and one of the hoses be attached to the sleeve 4. If the device is driven so that the piston 8 bumps against the elastic damping body 6 an extra impulse is obtained which contributes towards rapid return of the piston to its inner end position.

The described device can be manufactured at very low cost and will be highly functional and reliable, in that it does not contain any additional moving part over and above the said piston. On account of the positive pressure in the cylinder a tiny amount of air will continuously pass out between the cylinder and the piston, and this air current prevents direct metallic contact between the said parts, since it serves as a type of lubrication between them. No extra seals which are liable to wear are needed. The device also works very quietly and with an easily adjustable stroke frequency. The device can also be used without risk of failure in dusty and damp environments and at very low temperature in consequence of, among other things, the absence of sensitive valves and the cleaning effect of the air oozing out between the piston and the cylinder. Further, on account of its robust construction the device is highly resistant to external mechanical damage.

The vibrating device according to the invention can be utilized not only for the application mentioned in the introduction of this specification but also for other types of dust filters and in numerous other contexts, such as in the foundry and packaging industries. It is particularly valuable in applications requiring relatively powerful but gentle vibrations and where a low noise level is wanted.

The embodiment shown as an example in the drawing can be modified in several respects. For example, the sleeve-shaped piston can be given a relatively large wall thickness throughout its length, in which case its upper end surface can be made smaller and thinner. The opening 10 can be entirely excluded if the piston 8 is shortened so that in the outer position shown in FIG. 3 it goes clear of the opening of the outlet connection 3.

What is claimed is:

1. A vibrating device comprising
   a. a piston member,
   b. a cylinder member and means on said cylinder member for connecting said cylinder member to the body that is to be vibrated,
   c. said cylinder and piston members being disposed substantially coaxially and vertically with respect to each other so that the piston can reciprocate vertically up and down with respect to said cylinder and with only a very limited fluid flow between the exterior of said piston and the interior of said cylinder,
   d. a fluid inlet formed in the side wall of said piston and a fluid outlet formed in the sidewall of said piston at a point spaced away from said fluid inlet,
   e. a fluid outlet formed in the sidewall of said cylinder and a fluid inlet formed in the sidewall of said cylinder,
   f. said inlets and outlets being spaced apart so that
      1. the cylinder fluid inlet and the piston fluid inlet can be periodically aligned with each other,
      2. the cylinder fluid outlet and the piston fluid outlet can be periodically aligned with each other, and
      3. the inlets and outlets are never all aligned at the same time whereby upon alignment of said fluid inlets the pressure of the fluid introduced through said aligned inlets will cause the following sequence
      i. the piston to move axially upwardly with respect to said cylinder so that the piston and cylinder separate, then
      ii. the inlets in said piston and cylinder to move out of alignment so that there will be a cessation of fluid flow, then
      iii. the outlets in said piston and said cylinder to come into alignment thereby allowing the fluid that has moved the piston to escape, and
      iiii. the piston to return downwardly to its original position by virtue of its own weight whereby said inlets will once again be aligned.

2. A vibrating device according to claim 1 wherein the axial distance between the inlet and outlet openings in said piston member is greater than the axial distance between the inlet and outlet openings in said cylinder member.

3. A vibrating device according to claim 1 which additionally includes means attached to said cylinder member to limit the extent to which the piston can move axially with respect to said cylinder.

4. A vibrating device comprising
   a. a piston member having an end wall and a cylindrical side wall,
   b. a cylinder member having side walls that are concentric with respect to the side wall of said piston, and means on said cylinder member for connecting said cylinder member to the body that is to be vibrated,
   c. said piston member and cylinder member being disposed substantially vertically and coaxially with respect to each other so that the piston can reciprocate vertically up and down with respect to said cylinder with only a very limited fluid flow between the exterior of said piston side wall and the interior of said cylinder,
   d. inlet means in the sidewall of said piston member for introducing fluid under pressure into the interior of said piston so as to cause said piston member to move upwardly with respect to said cylinder member,
   e. outlet means in the sidewall of said cylinder member for permitting the escape of pressurized fluid from both said piston and cylinder means so that the piston member can fall back to its original position by virtue of its own weight,
   f. said inlets and outlets being spaced apart so that
      1. the cylinder fluid inlet and the piston fluid inlet can be periodically aligned with each other, 2. the cylinder fluid outlet and the piston fluid outlet can be periodically aligned with each other, and 3. the inlets and outlets are never all aligned at the same time.

* * * * *